US007285258B2

United States Patent
Pugach

(10) Patent No.: US 7,285,258 B2
(45) Date of Patent: Oct. 23, 2007

(54) CONVERSION OF CO TO $CO_2$

(75) Inventor: Joseph Pugach, Monroeville, PA (US)

(73) Assignee: Pressure Chemical Company, Pittsburgh, PA (US)

( * ) Notice: Subject to any disclaimer, the term of this patent is extended or adjusted under 35 U.S.C. 154(b) by 129 days.

(21) Appl. No.: 10/806,837

(22) Filed: Mar. 23, 2004

(65) Prior Publication Data

US 2004/0175319 A1    Sep. 9, 2004

Related U.S. Application Data

(63) Continuation-in-part of application No. 09/997,617, filed on Nov. 29, 2001, now abandoned.

(51) Int. Cl.
| | | |
|---|---|---|
| *B01J 23/52* | (2006.01) | |
| *B01J 23/745* | (2006.01) | |
| *B01J 37/00* | (2006.01) | |
| *C01B 3/58* | (2006.01) | |

(52) U.S. Cl. .................. 423/246; 423/247; 502/38; 502/53; 502/325; 502/344

(58) Field of Classification Search ............... 423/246, 423/247; 502/325, 344, 38, 42, 53

See application file for complete search history.

(56) References Cited

U.S. PATENT DOCUMENTS

| | | | | |
|---|---|---|---|---|
| 4,839,327 A | * | 6/1989 | Haruta et al. ............. 502/243 |
| 4,937,219 A | * | 6/1990 | Haruta et al. ............. 502/174 |
| 5,051,394 A | * | 9/1991 | Haruta et al. ............. 502/324 |
| 5,068,217 A | * | 11/1991 | Falke et al. ............... 502/330 |
| 5,112,787 A | * | 5/1992 | Falke et al. ............... 502/159 |
| 5,550,093 A | * | 8/1996 | Wan et al. .................. 502/74 |
| 5,759,949 A | * | 6/1998 | Grigorova et al. ......... 502/330 |
| 5,789,337 A | * | 8/1998 | Haruta et al. ............. 502/344 |
| 6,086,835 A | * | 7/2000 | Grigorova et al. ....... 423/245.3 |
| 2001/0043899 A1 | * | 11/2001 | Hosaka et al. ............ 423/247 |

FOREIGN PATENT DOCUMENTS

| | | | |
|---|---|---|---|
| DE | 39 14 294 A1 | * | 10/1990 |
| DE | 198 36 585 C1 | * | 5/2000 |

OTHER PUBLICATIONS

The English translation of DE 198 36 585 C1 published on May 11, 2000.*

* cited by examiner

*Primary Examiner*—Timothy C. Vanoy
(74) *Attorney, Agent, or Firm*—Beck & Thomas, P.C.

(57) ABSTRACT

Gold oxide is precipitated together with iron oxide from a solution containing a gold source and an iron source; the gel formed thereby is washed, dried, ground to a size range of 0.85 mm to 4.25 mm, calcined and activated by passing a hydrogen and oxygen containing gas through it; then used as a catalyst for oxidizing CO to $CO_2$ in the presence of a large excess of hydrogen.

26 Claims, No Drawings

CONVERSION OF CO TO $CO_2$

RELATED APPLICATION

This is a continuation-in-part of copending application Ser. No. 09/997,617 filed Nov. 29, 2001 now abandoned and titled "Conversion of CO to $CO_2$"

TECHNICAL FIELD

A catalyst containing both gold and iron is used in oxidation processes. It is especially useful for the oxidation of carbon monoxide with gaseous oxygen to carbon dioxide, particularly in the presence of a large excess of hydrogen.

BACKGROUND OF THE INVENTION

Many workers in the art of catalysis have centered their attention on efforts to create gold catalysts of a fine size effective to catalyze the oxidation of carbon monoxide to carbon dioxide, particularly in the presence of a large excess of hydrogen and in mixtures of gases wherein the carbon monoxide is a small percentage. The fine size thought to be beneficial for providing a large contact surface for the reactants. See, for example, Haruta et al U.S. Pat. Nos. 4,839,327 and 5,506,273. Some workers deposit and therefore spread out their catalyst compositions on porous supports, such as described by Grigorova et al in U.S. Pat. Nos. 5,665,668 and 5,759,949; Haruta et al, in U.S. Pat. No. 4,939,219, propose placing the gold on an alkaline earth metal support.

In German patent DE 198 36 585 C1, Plzak first states that it is desirable for the catalyst materials of his invention to have specific surface areas as high as possible and then describes three variations of his preparation of gold-containing catalysts for CO oxidation. In the first, the material is produced sequentially—that is, an iron salt is first reacted with a base to form an iron hydroxide gel, then the gel is impregnated with a solution of a gold compound, to "deposit complexed Au clusters on the surface of the hydroxide gel in the finest distribution" (*um komplexierte Au-Cluster auf der Oberfläche des Hydroxidgels in feinster Verteilung abzuscheiden*—p3, line 44. The authors go on to say that much smaller Au clusters can be fixed on the $Fe_2O_3$ support material by the sequential process than by a coprecipitation process. The sequential process is therefore considered to be superior to the coprecipitation process, but Plzak does not recognize the disadvantages of using a powder in the CO oxidizing step.

In Plzak's second stated process, a sinter inhibitor which is an oxide of aluminum, chromium, or magnesium is created during the first step of iron precipitation by including with the reactants a water soluble salt of Al, Cr or Mg. A third variation calls for the inclusion of the Al, Cr or Mg salt along with all the other reactants in the coprecipitation procedure. The sequential process is still considered by Plzak to be superior.

The reader may be interested in Haruta et al's Example 1 of U.S. Pat. No. 5,506,273 which prepares a catalyst containing a metal oxide and gold, said to be useful for oxidation of carbon monoxide.

The art is in need of a convenient process for oxidizing CO in a mixture including a high level of hydrogen with an acceptable pressure drop.

SUMMARY OF THE INVENTION

My invention provides a simplified procedure for making a gold catalyst which is convenient to use; the gold catalyst does not require a separate solid or porous support and is highly efficient for the oxidation of carbon monoxide in mixed gases, particularly in mixed gases containing a large excess of hydrogen.

My catalyst is made using solutions of materials, yet a hard, highly efficient catalyst results. Gold oxide is precipitated from a solution of a gold source in the presence of an iron source in solution while controlling the pH of the solution preferably at 7.8 to 8.2, thereby causing the formation of a gold oxide precipitate either onto or intimately mixed with an iron oxide precipitate, separating the precipitate combination from the solution, washing it, drying it, grinding it, and only then calcining it. The calcined catalyst is activated as described below. The iron compound solution may be made separately, or the iron and gold sources may be combined in a single solution and a separate solution added slowly to maintain the desired pH during the precipitation process. Preferably the precipitation is brought about by adding both the iron and gold source solutions gradually to neutral water together with the gradual addition of a solution of the pH-maintaining base.

The gold source may be any gold salt or compound which will yield gold oxide from solution in the presence of a base. Examples of such gold sources are gold (III) chloride, iodide and bromide, gold (III) nitrate, hydrogen tetrahaloaurates and their alkali metal salts where the halogen is other than fluoride, and hydrogen nitroaurate.

As the iron source, any iron compound capable of forming $Fe_2O_3$ in a basic aqueous solution may be used. Water-soluble iron salts are preferred. Iron nitrate is preferred as the iron source, as its extraneous components, i.e. the nitrogen, will burn off with little contamination or other problems during calcination, whereas materials such as iron sulfate and ferric chloride would require much more washing and other treatment to prepare the catalyst for commercial use.

Suitable alkali metal bases which may be used are alkali metal carbonates, bicarbonates and hydroxides.

Persons skilled in the art will recognize that the pH is maintained during the precipitation of the iron and gold. If the pH is allowed to drift outside the ranges specified (preferably 7-9), one undesirable result will be that the particle size of the precipitate will be adversely affected. A pH range of 7.5 to 8.5 is preferred; more preferably, the solutions are maintained at pH 7.8-8.2 during the precipitation process.

Persons skilled in the art may appreciate that the iron precipitate will comprise $Fe_2O_3$ in an aqueous network. The iron oxide will tend to polymerize, and is de-oxidized during calcination, so that the final product is a gold metal deposit on an iron oxide ($Fe_3O_4$) support.

Gold should be present in the final product as 0.25 to 10% by weight of the iron oxide. Higher amounts of gold may be used but are not necessary for the efficient function of the catalyst in the oxidation of carbon monoxide to carbon dioxide in the presence of an excess of hydrogen. A preferred range of gold content for that purpose is 1-3%.

After the combined precipitate (sometimes herein referred to as solids) is separated from the suspension or solution, it is washed, dried, ground and then calcined, and activated as described below. The desired particulate range may be achieved by any known procedure of grinding, screening and the like. For use in oxidizing carbon monoxide to carbon dioxide in a gas stream including hydrogen and oxygen, a size range of 0.85 mm to 3.25 mm is preferred; a range of 1 mm to 1.4 mm is more preferable.

I prefer to dry the catalyst by passing air through and over a bed of the catalyst for a time sufficient to remove substantially all moisture (usually at least two hours), then grind it to the desired size, 0.5 to 3.25 mm. Calcination may be accomplished in any conventional manner. Calcination of the ground material may be done by heating the ground material gradually to reach a temperature of 200-500° C. within an hour, and maintaining the temperature within that range for at least one-half hour. Preferably the temperature is ramped from room temperature to about 300-400° C. within an hour and increased another 25-75° C. during a holding period of 0.5 to 3 hours.

Activation can be conducted at any time and place after calcination. Preferably, it will be performed at the manufacturing site, but it may alternatively be performed in situ—that is, in the catalyst bed where it will be used.

If activation is conducted at the manufacturing site or elsewhere prior to installation in the vessel where it will be used, the calcined catalyst is treated by passing through it a gas mixture comprising oxygen and hydrogen for a period of at least twelve hours. During this time, hydrogen will be oxidized, but at a point in time after 12 hours, the percent of hydrogen present in the feed gas being oxidized will begin to diminish. The percentage of hydrogen in the feed gas being oxidized will trail off to achieve a low level no later than about 48 hours after the procedure is begun. It is believed that some catalytic sites in the fresh catalyst will preferentially oxidize hydrogen as opposed to CO that is present in the gas; it is these sites that are utilized in the activation step, and during the activation step they are neutralized and become incapable of any significant oxidation of hydrogen. The catalyst thus activated is thereafter preferential to the oxidation of CO, permitting the greater part, and normally substantially all, of the hydrogen present in the feed gas, even if it is present in overwhelming amounts, to pass through the catalyst unaffected.

As indicated above, activation is conducted using a gas mixture containing oxygen and hydrogen for a period of at least 12 hours. As oxygen/hydrogen mixtures tend to be explosive, it is recommended that the volume of oxygen with respect to hydrogen be kept lower than 6%. A useful mixture is 0.25 to 6% by volume oxygen in hydrogen or, where other gases are present (such as nitrogen) a volume ratio of 0.25/65 to 6/65 oxygen to hydrogen present. A preferred oxygen content is 1% to 5% by volume of the hydrogen volume. Air may be used as the source of oxygen. In any case, the mixture may be passed through the catalyst for 12 to 48 hours (or more if the gas mixture is diluted with an inert gas). Suitable temperatures for the activating step are 60-90° C., preferably 65-75° C., and a preferred time period is 24-36 hours.

If it is desired to activate the catalyst at the CO-oxidizing site (the end-use site), the feed gas for activation may be the feed gas for the CO-oxidizing process to which oxygen has been added. In this case, the feed gas will be a gas comprising at least 65% by volume hydrogen, and oxygen will be added to provide an activating mixture similar to that mentioned above for activation at the manufacturing site or otherwise prior to use—that is, a gas mixture comprising at least 65% by volume hydrogen, and 0.25% to 6% by volume oxygen (based on the hydrogen). This mixture will be passed through the catalyst at a temperature from 60-90° C., preferably 65-75° C., for a period of 12 to 48 hours, normally from about 24-36 hours. The catalyst may be left in the bed and an optimum amount of oxygen for continuing addition to the incoming feed gas may be determined from the conversion efficiency of the process.

The unsupported catalyst so made is excellent for use in fuel cells where available methane or methanol reformation reaction product can be used for oxidization of CO to CO2. The fuel cell may be used to generate electricity or otherwise to use the energy produced, while separating the hydrogen.

Thus the invention includes a method of operating a fuel cell wherein the fuel cell includes a catalyst bed comprising a catalyst made by the above method, including passing the product of a methane reformation reaction through the bed together with oxygen to oxidize the carbon monoxide while permitting substantially all the hydrogen to pass through unoxidized.

DETAILED DESCRIPTION OF THE INVENTION

Following are examples of the invention.

INVENTION EXAMPLE 1—CO-PRECIPITATION

A solution of 1.0 M $Fe(NO_3)_3$ was prepared by dissolving 171 g of $Fe(NO_3)_3 \cdot 9H_2O$ in 355 ml of deionized water. To this solution was added 2.0 g of $HAuCl_4 \cdot 3H_2O$, which dissolved completely. A solution of 150 g of $Na_2CO_3$ in 1500 ml of deionized water was also prepared.

Both of the above solutions were added with stirring to 1500 ml of deionized water at 60° C. at such a rate as to maintain the pH at 8.0±0.2. The addition took about an hour and stirring was continued for an additional 0.5 hour after addition was complete. The suspension was allowed to cool to room temperature and filtered through a Buchner funnel. The solids were then re-slurried in 2500 ml of deionized water at room temperature for 0.25 hour and filtered using the Buchner funnel. This washing procedure was repeated three times and the solids then dried in an oven at 80° C. overnight. The very hard solids were then ground in a mortar and pestle and sieved through a 12, 14 and a 20 mesh screen. The particles that were collected on the 14 and 20 mesh screens were combined and placed in a porcelain crucible in an oven under a stream of air and calcined by ramping the temperature to 350° C. in 0.5 hour, then ramping to 400° C. in 0.25 hour and holding at 400° C. for an additional 0.5 hour.

COMPARATIVE EXAMPLE 1A—SEQUENTIAL PRECIPITATION

To 1500 ml of deionized water was added with stirring a solution of 400 ml of 1.0 M $Fe(NO_3)_3$ and a solution of 150 g of $Na_2CO_3$ in 1500 g of deionized water at such a rate that the pH of the solution was maintained at pH 8.0±0.2. The addition time was approximately 1.0 hours. An iron oxide precipitate was formed. The solution was then cooled with agitation to 60° C. and a solution of 2.0 g of $HAuCl_4$ in 150 ml of deionized water was then added along with additional $Na_2CO_3$ solution prepared as above at such a rate that the pH was maintained at 8.0±0.2. This addition took approximately 0.5 hour and the mixture was then stirred an additional 0.5 hours and then allowed to cool to room temperature. The washing and calcination procedures were the same as in Example 1. The yield of 14-20 mesh material in this case was 35%.

Testing—Procedure

The reactor used for testing was a 0.5-inch diameter by 12-inch length jacketed tube. Heat was supplied by fluid flowing through the jacket at temperatures between 70 and 75° C. A thermocouple was positioned so that it would sit in the middle of the catalyst bed. The catalyst was held in place by glass wool plugs.

A gas mixture of the following composition was used for all testing. $H_2$, 74%; $CO_2$, 18.8%; CO, 3300 ppm and the balance argon. Air was used as the source of oxygen. Both gasses were metered by pre-calibrated flow meters and mixed in a tee just before entering the reactor containing the catalyst. The exit gasses were flushed through a small Infra Red gas sampling cell for 2.0 hours before each measurement. The spectra were recorded on a Nicolet 210 FTIR spectrophotometer. Each sample was compared to a sample of the initial gas mixture before it was fed into the reactor.

INVENTION EXAMPLE 2—USE OF THE CATALYST OF INVENTION EXAMPLE 1

The reactor was charged with 9.0 ml of the catalyst prepared by co-precipitation in Example 1. An initial $N_2$ purge of the catalyst was done at about 2.0 L/hr, and heating fluid maintained between 70 and 75° C. was circulated through the reactor jacket. When the reactor thermocouple reached the same temperature as the circulating fluid, the $N_2$ was shut off and the CO containing gas mixture and air were introduced at 1700 and 400 ml/hr respectively, which is a gas hourly space velocity of 233 $hr^{-1}$. Initially there was water made and CO oxidation was not very efficient, but within 24 hours, water had stopped and CO conversion rose steadily. After an additional 16.0 hours the CO conversion had risen to better than 95%. In order to determine whether the catalyst was productive at higher space velocities, the flow of the CO gas mixture was increased to 9000 ml/hr and the airflow was increased to 2800 ml/hr, or a space velocity of 1311 $hr^{-1}$. The CO conversion was over 90%.

COMPARATIVE EXAMPLE 2A—USE OF THE CATALYST OF COMP. EXAMPLE. 1A

The same procedure was used as in Invention Example 2 except that 14 ml of catalyst made by Comparative Example 1A was used. The same gas flows were also used so the space velocity in this example was 150 $hr^{-1}$. Water was again formed initially and stopped within 24 hours. After the water formation ceased the CO conversion increased steadily and after 16 hours was over 95%.

Contrary to the Plzak disclosure in German patent 198 36 585, it is clear from the above that the coprecipitation procedure is substantially equivalent to the sequential procedure when one follows my particular steps to obtain the desired size before calcining and utilizing the activating step described herein. The size I use, 0.85 to 3.25 mm, preferably 1-1.4 mm, is highly beneficial for commercial catalyst beds where pressure drop is a significant factor; my catalyst causes a far lower pressure drop than the powder used by Plzak. Plzak's powder is obtained at the end of his Example 2 by grinding. Unlike Plzak's precipitate, my dried precipitate is ground to a larger size, and I am able to do this before calcining.

By utilizing an unsupported catalyst made in accordance with my invention, large portions of hydrogen present in a shift gas, methane reformation product, or other mixed gas source will not adversely affect the CO oxidation process. The following experiments were performed to show that otherwise similar supported catalysts inefficiently produce large quantities of water in the presence of such a gas. The produced water not only drastically reduces the efficiency of the catalyst in terms of site usage, but in due course the catalyst bed will be physically obstructed by the water produced.

Preparation of a Supported Au/Fe Catalyst 200 g of $Fe(NO_3)_3 \cdot 9H_2$) in a 600 ml beaker were dissolved in enough deionized water to give 160 ml of solution. To this was added 200 g of ⅛ inch JM-90 alumina pellets, the pellets being totally submersed in the solution. The mixture thus made, was placed in a vacuum desiccator, which was evacuated to 15 Torr in order to concentrate the solution. Enough water was removed so that the level of the solution was about the same as the level of the alumina pellets. The mixture was then poured into a sieve and the pellets collected in the sieve. The 70 ml of aqueous filtrate was discarded and the impregnated alumina pellets were spread evenly over the bottom of a large evaporating dish.

A solution of 70 g $Na_2CO_3$ in 200 ml of deionized water was prepared and 115 ml of this solution was added to the pellets with stirring. A pH electrode was placed in the solution and the initial pH was measured at 9.2, but had dropped to 8.1 after 15 minutes. The bicarbonate solution was diluted with deionized water to half its original concentration and it was added in small portions with stirring in order to maintain the pH between 7.5 and 8.3. Total addition time after this point was 55 minutes and a total of 162 ml of carbonate solution measured at the original concentration had been added.

The whole mixture was then poured into a sieve and the solution and most of the unbound precipitated hydrous ferric oxide were collected in a beaker. The evaporating dish was rinsed with a few ml of water and this was poured over the pellets and combined with the aqueous mixture of hydrous ferric oxide. The latter was then filtered on a Buchner funnel, washed with several portions of deionized water and the wash filtrates combined. The pellets were poured from the sieve into the evaporating dish and covered with the combined filtrate from the hydrated ferric oxide washing. This was heated to 80° C. on a hot plate with agitation for 1.0 hours. The temperature was then lowered to 60° C. in preparation for gold deposition.

A solution of $HAuCl_4$ was prepared by dissolving 5.3 g of the latter in 15 ml of deionized water. About half of this solution was added, with stirring to the suspended alumina pellets and the pH dropped from 7.1 to 6.0. Enough of the dilute $Na_2CO_3$ solution as used in the hydrated ferric oxide precipitation was then added until the pH rose to 7.6. The rest of the Au solution was then added, the total addition time being three minutes. Enough carbonate solution was added in 0.5 hours to maintain the pH level between 6.5 and 7.1. After an additional 15 minutes the pH started to rise from 6.5 and in the course of another hour, it had risen to 7.1 without the addition of any further carbonate solution. The color of the solution went from pale yellow to water white, indicating that all of the gold had been adsorbed. During this whole period, the temperature had been maintained at 60° C.

The mixture was poured into a sieve to collect the pellets and a total of 430 ml of filtrate was also collected. The sieve was placed in an evaporating dish, enough water added to cover the pellets and a stream of water run over the pellets overnight for final washing. After this time, the pellets were placed on a Buchner funnel and a clean dry air stream was passed up through the funnel for 3.5 hours at room temperature at which point the pellets were considered dry enough for calcination. Portions of the catalyst were then calcined in different ways:

1. A porcelain dish containing 100 g of catalyst was placed in a muffle furnace and the temperature ramped to 350° C. under a slow air stream in one hour. The temperature was then increased to 400° C. in the course of 15 minutes and held at this temperature for an additional 0.5 hours.
2. A porcelain dish containing 100 g of catalyst was placed in a muffle furnace and the temperature ramped to 300° C. in one hour's time under a slow air stream. The temperature was then increased to 350° C. and kept there for 2.0 hours.

Testing 14.0 ml of each catalyst was tested in the same reactor and under the same conditions as in Example 2. The results for both catalysts were the same.

Both converted 90% of the CO to $CO_2$ from the inception of the tests. Both also produced copious amounts of water from the inception of the tests. The water production continued during the 120 hours of operation at the same level as at the start of the test. There was no sign of any lessening in the water make.

These results, show that there are significant differences between the unsupported catalyst of this invention and a similar catalyst on an alumina support. The catalyst of this invention selectively oxidizes CO to $CO_2$ in the presence of a large amount of $H_2$ while the alumina-supported catalyst shows no such selectivity. It is indeed a good catalyst for CO oxidation, but it also functions well to oxidize $H_2$ to water.

My invention therefore is a method of oxidizing CO in a mixture of gases including oxygen (that is, not including the oxygen bound in $CO_2$, for example) and at least 65% hydrogen (by volume), comprising passing the mixture of gases through a catalyst bed comprising a an unsupported catalyst made by (a) preparing an aqueous iron/gold solution comprising an iron source and a gold source (b) gradually combining the iron/gold solution with an aqueous solution of an alkali metal base to maintain a pH of 7 to 9 in the combined solution as the solutions are combined, thereby producing solids in the combined solution (d) separating the solids from the combined solution (e) washing the solids, (f) drying the solids, (g) grinding the solids to a size range of 0.85 mm to 4.25 mm, and (h) calcining the solids. More particularly, the gas mixture treated may comprise 200 ppm to 20,000 ppm carbon monoxide and at least 10% carbon dioxide and, in most cases will be the product of a methane reformation reaction, containing methane and water as well. Oxygen should be added or otherwise present, preferably in a ratio of 1:1 to 10:1 of oxygen to carbon monoxide. As indicated above in the examples, the catalyst is initially activated by passing a gas in contact with it; the gas containing oxygen and hydrogen will make water for a short period of time.

The invention claimed is:

1. Method of oxidizing CO in a mixture of gases including oxygen and at least 65% by volume hydrogen comprising passing said mixture of gases through a catalyst bed comprising an unsupported catalyst made by (a) preparing an aqueous iron/gold solution comprising an iron source and a gold source (b) gradually combining said iron/gold solution with an aqueous solution of an alkali metal base to maintain a pH of 7 to 9 in the combined solution as the solutions are combined, thereby producing solids in said combined solution (c) separating said solids from said combined solution (d) washing said solids, (e) drying said solids, (f) grinding said solids to a size range of 0.85 mm to 4.25 mm, (g) calcining said solids, and (h) activating said catalyst by passing a hydrogen and oxygen containing gas through said catalyst for at least 12 hours at a temperature of 60-90° C.

2. Method of claim 1 wherein said gold source comprises $HAuCl_4 \cdot 3H_2O$.

3. Method of claim 1 wherein said iron source comprises $Fe(NO_3)_3 \cdot 9H_2O$.

4. Method of claim 1 wherein step (b) is conducted at a temperature of 50° C. to 90° C.

5. Method of claim 1 wherein said pH is maintained at 7.5-8.5.

6. Method of claim 1 wherein the hydrogen and oxygen containing gas in step (h) is passed through said catalyst for a period of 12-36 hours at a temperature of 65-75° C.

7. Method of claim 1 wherein said gold is present in said catalyst as 0.25% to 10% by weight of said iron oxide.

8. Method of claim 7 wherein said gold is present in said catalyst as 1% to 3% by weight of said iron oxide.

9. Method of claim 1 wherein said alkali metal base is sodium carbonate.

10. Method of claim 1 wherein said mixture of gases comprises 200 ppm to 20,000 ppm by volume carbon monoxide and at least 10% by volume carbon dioxide.

11. Method of claim 1 wherein said catalyst has a size range of 1 mm to 1.4 mm.

12. Method of oxidizing CO in a mixture of gases including oxygen and at least 65% hydrogen by volume and wherein said CO is present in an amount from 200 ppm to 20,000 ppm by volume, said gas also containing methane, comprising passing said mixture of gases through a catalyst bed comprising a particulate unsupported catalyst made by (a) preparing an aqueous iron/gold solution comprising an iron source and a gold source (b) gradually combining said iron/gold solution with an aqueous solution of an alkali metal base to maintain a pH of 7 to 9 in the combined solution as the solutions are combined, thereby producing solids in said combined solution (c) separating said solids from said combined solution (d) washing said solids, (e) drying said solids, (f) grinding said solids to a size range of 0.85 mm to 4.25 mm, (g) calcining said solids, and (h) activating said catalyst by passing through said catalyst a mixture of hydrogen and oxygen in a ratio by volume of about 0.25/65 to 6/65 for at least 12 hours, wherein the gold in said catalyst is present in an amount from 0.25% to 10% by weight of the iron in said catalyst.

13. Method of claim 12 wherein said gold is present as 1-3% of the weight of said iron.

14. Method of claim 12 wherein said mixture of hydrogen and oxygen used in step (h) is passed through said catalyst at 60-90° C. for 12 to 48 hours.

15. Method of claim 14 wherein said mixture of hydrogen and oxygen used in step (h) is passed through said catalyst for 24 to 36 hours.

16. Method of claim 14 wherein said mixture of hydrogen and oxygen used in step (h) comprises hydrogen and 1-5% oxygen by volume based on the hydrogen.

17. Method of claim 1 wherein said hydrogen and oxygen containing gas used in step (h) includes air as a source of oxygen, at least 65% by volume hydrogen, and 0.25-6% by volume oxygen based on said hydrogen.

18. Method of claim 1 wherein said hydrogen and oxygen containing gas is passed through said catalyst for 24 to 36 hours.

19. Method of claim 17 wherein said oxygen is present in said gas at 1-5% by volume.

20. Method of claim 1 wherein said calcining is performed by heating said ground solids gradually to reach a temperature of 200-500° C. within an hour, and maintaining the temperature within that range for at least one-half hour.

21. Method of oxidizing CO in a mixture of gases including oxygen and at least 65% by volume hydrogen comprising passing said mixture of gases through a catalyst bed comprising an unsupported catalyst made by (a) preparing an aqueous iron solution from a suitable iron source (b) preparing an aqueous gold solution from a suitable gold source (c) gradually combining said iron solution with an aqueous solution of an alkali metal base to maintain a pH of 7 to 9 in the combined solution as the solutions are combined, thereby producing a slurry of solid in said combined solution (d) gradually combining said gold solution with the slurry while also adding a solution of an alkali metal base to maintain the pH at 7 to 9 in said slurry (e) separating the solids from said slurry (f) washing said solids (g) drying said solids (h) grinding said solids to a size range of 0.85 mm to 4.25 mm (l) calcining said solids and j) activating said catalyst by passing a hydrogen and oxygen containing gas through said catalyst for at least 12 hours at a temperature of 60-90° C.

22. Method of claim 21 wherein said gold source comprises $HAuCl_4 \cdot 3H_2O$.

23. Method of claim 21 wherein said iron source comprises $Fe(NO_3)_3 \cdot 9H_2O$.

24. Method of claim 21 wherein said gold is present in said catalyst as 0.25% to 10% by weight of said iron oxide.

25. Method of claim 21 wherein said hydrogen and oxygen containing gas used in step (h) includes air as a source of oxygen, at least 65% by volume hydrogen, and 0.25-6% by volume oxygen based on said hydrogen.

26. Method of claim 21 wherein said mixture of hydrogen and oxygen used in step (h) is passed through said catalyst at 60-90° C. for 12 to 48 hours.

* * * * *

UNITED STATES PATENT AND TRADEMARK OFFICE
CERTIFICATE OF CORRECTION

PATENT NO. : 7,285,258 B2
APPLICATION NO. : 10/806837
DATED : October 23, 2007
INVENTOR(S) : Joseph Pugach It is certified that error appears in the above-identified patent and that said Letters Patent is hereby corrected as shown below:

Column 1, Line 24 cancel "The fine size thought", and insert --The fine size is thought--

Column 4, Line 6 cancel "CO2", and insert --$CO_2$--

Column 7, Line 37 cancel "a an", and insert --an--

Column 7, Line 43 cancel "(d)", and insert --; (c)--

Column 7, Line 44 cancel "(e) washing the solids (f)", and insert --; (d) washing the solids; (e)--

Column 7, Line 45 cancel "(g)", and insert --; (f)--

Column 7, Line 46 cancel "mm, and (g)", and insert --mm; and (g)--

Signed and Sealed this

Fifteenth Day of April, 2008

JON W. DUDAS
*Director of the United States Patent and Trademark Office*